United States Patent Office 3,753,928
Patented Aug. 21, 1973

3,753,928
CATALYST FOR THE PREPARATION OF
TRANS-POLYPENTENAMERS
Nikolaus Schon, and Gottfried Pampus, Leverkusen, Josef Witte, Cologne, and Dieter Theisen, Remscheid, Germany, assignors to Bayer Aktiengesellschaft
No Drawing. Filed Feb. 1, 1971, Ser. No. 111,763
Claims priority, application Germany, Feb. 14, 1970,
P 20 06 776.9
Int. Cl. C08f 5/00
U.S. Cl. 252—429 B                    6 Claims

ABSTRACT OF THE DISCLOSURE

Process for the ring opening polymerisation of cyclomonoolefins by contacting the cyclomonoolefins with a catalyst consisting of (a) a reaction product of a tungsten or tantalum halide with an acetal and
(b) an organo compound of a metal of groups Ia to IVa of the Periodic Table the molar ratio of tungsten:metal of groups Ia to IVa being from 1:0.3 to 1:10 and the molar ratio of tantalum: metal of groups Ia to IVa being from 1:1 to 1:10.

---

Cyclopentene can be polymerised using organometallic mixed catalysts obtained from alkyl aluminium compounds and tungsten salts. Polymerisation is accompanied by ring opening and unsaturated high molecular weight hydrocarbons are obtained whose double bonds are predominantly in the trans configuration. A process for the preparation of such trans-polypentenamers by bulk polymerisation of cyclopentene has been disclosed in British patent specification No. 1,010,860. This process, however, requires large quantities of catalyst and temperature control is difficult, particularly if polymerisation is not stopped after only a low conversion. Moreover, the long reaction times and low conversions are disadvantages which cannot be overlooked. British patent specification No. 1,062,367 relates to a process for the preparation of trans-polypentenamers in which catalysts are used which are obtained by reacting tungsten salts with oxygen compounds containing O—O or O—H bonds and organic aluminium compounds. The quantities of catalyst required, however, are again very high and the conversions, being in the order of 30–50%, are too low to be of technical interest.

The catalysts for this process are prepared in a heterogeneous reaction between tungsten salts and an aluminium alkyl compound, if desired, with the addition of a third component, and this reaction is not reproducible. It is only in solution that heavy metal complex catalysts can be obtained in a reproducible manner and it is only with such catalysts that the polymerisation process becomes controllable.

If hydrocarbons are used as solvents for preparing such catalysts, however, the quantity of solvent required is very large because tungsten salts are only sparingly soluble in hydrocarbons. In addition, a large quantity of solvent is required for the polymerisation itself, and this solvent subsequently has to be recovered. Furthermore, the recovered hydrocarbon solvent must be carefully purified before it can be used again because otherwise any olefines contained in it are liable to undergo Friedel-Crafts reactions with the tungsten salts to form completely insoluble compounds which contain tungsten.

The present invention relates to catalysts for the ring opening polymerisation of cyclopentene which are readily soluble in hydrocarbons and halogenated hydrocarbons which catalysts consist of (a) a reaction product of a tungsten halide or tantalum halide with an acetal and
(b) an organo compound of a metal of groups Ia to IVa of the Periodic Table preferably an organo aluminium compound, the molar ratio of tungsten:metal of groups Ia to IVa being between 1:0.3 and 1:10 and the molar ratio of tantalum:metal of groups Ia to IVa being between 1:1 and 1:10.

Another object of the invention is a process for the ring opening polymerisation of cyclopentene in solution in an organic solvent in the presence of a catalyst, consisting of (a) a reaction product of a tungsten halide or tantalum halide with an acetal and
(b) an organo compound of a metal of groups Ia to IVa of the Periodic Table preferably an organo aluminium compound, the molar ratio of tungsten: metal of groups Ia to IVa being between 1:0.3 and 1:10 and the molar ratio of tantalum: metal of groups Ia to IVa being between 1:1 and 1:10.

Preparation of the catalysts: The tungsten or tantalum halides used for the preparation of the catalysts may advantageously be the fluorides, chlorides and bromides and oxyhalides, such as $WCl_6$, $WOCl_4$, $WCl_4$, $WBr_5$, $WF_6$, $TaCl_5$ and $TaBr_5$.

Suitable acetals are, in particular, compounds of the following formula:

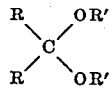

in which R represents a hydrogen atom or an alkyl, isoalkyl, cycloalkyl, aryl or alkaryl radical which may be halogenated and R' represents an alkyl, isoalkyl, aryl or alkaryl radical which may be substituted with halogen. It is particularly advantageous to use (iso) alkyl radicals containing 1–6 carbon atoms such as methyl, ethyl, isopropyl, n-propyl, n-, i- or t-butyl, hexyl and aryl radicals containing up to 12 carbon atoms such as phenyl, naphthyl, benzyl.

The following are examples of acetals which are especially suitable:

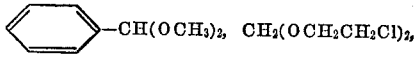
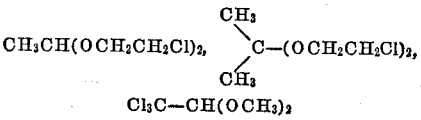

$Cl_3C$—$CH(OCH_3)_2$

To prepare the catalysts, the tungsten or tantalum halides may first be reacted with the acetals in solution in aliphatic, cycloaliphatic or aromatic hydrocarbons or halogenated hydrocarbons. The following are examples of suitable solvents: pentane, hexane, isooctane, benzene, toluene, xylene, cyclohexane, chlorobenzene, chloroform, carbontetrachloride, tetrachloroethane and trichloroethylene. It is advantageous to use the same solvent as that which is used for the subsequent polymerisation.

The reaction temperature for the reaction of the tungsten and tantalum halogen compounds with the acetals may be between 0° C. and 100° C. Temperatures of between 15° C. and 60° C. are preferably employed.

The molar ratio of tungsten or tantalum halide to acetal may be between 1:0.6 and 1:x, where x is the number of halogen atoms of the metal halide. The best results are generally obtained with 0.75–2 mols of acetal per mol of metal halide.

For the reaction of the tungsten or tantalum halides with the acetals, unsaturated or saturated solutions (possibly with sediment) of the metal halides in one of the solvents mentioned above may be used as starting material, the acetal being added slowly and the components being mixed at the same time. The reaction is slightly exothermic so that cooling may be required to maintain a particular reaction temperature or the rate of addition of the acetals must be suitably controlled. Any metal halide sediment which is present slowly dissolves in the course of the reaction. The solutions obtained are generally deep red to brown in colour. The colour is slightly less intense if large quantities of acetal are present. The reaction may also be carried out by introducing an acetal solution into the reaction vessel and adding the tungsten or tantalum halide.

The reaction times depend mainly on the concentration and the reaction temperature as well as on the particle size of the metal halides which form a sediment. They are generally in the order of 15 to 120 minutes. For example, reaction times of 30–60 minutes are sufficient at 30° C., The reaction products of tungsten or tantalum halides and the acetals, in contrast to the parent halides, are easily soluble in the solvents used, so that solutions which have a high concentration of tungsten or tantalum can easily be prepared. In contrast to the original halides, they result in much more active catalysts for the polymerisation of cyclopentene, so that the required catalyst amount is reduced and yet high conversions are achieved. Even the combination of tungsten halide and peroxide or alcohol according to British patent specification No. 1,062,367 has has an inferior activity as compared to the catalysts according to the invention.

The acetals used according to the invention also increase the catalyst activity if they are used as cocatalysts for tungsten or tantalum halide catalysts, but the activity obtained is nowhere near as great as the activity of catalysts obtained from the reaction products according to the invention.

The second catalyst component used consists of organic aluminium compound, e.g. aluminium trialkyls, aluminium alkyl halides, aluminium alkyl hydrides or aluminium alkyl compounds which have alkoxy or amino groups; alkyl, alkoxy and secondary alkyl amino radicals containing 1–6 carbon atoms being preferred. Examples are $Al(C_2H-)_3$, $Al(C_4H_9)_3$,
$Al(C_4H_9)_2H$,
$Al(C_6H_{13})_3$
$Al(C_2H_5)_2Cl$,
$Al(C_4H_9)_2Cl$,
$Al(C_2H_5)Cl_2$,
$Al(C_4H_9)Cl_2$,
$Al(C_2H_5)_2N(CH_3)_2$, and
$Al(C_2H_5)_{1.5}Cl_{1.5}$ One may also use mixtures of such compounds or other metal alkyls which have a comparable activity, such as tin alkyls, tin alkyl hydrides (especially tin dialykyl dihydrides) or zinc alkyls (alkyl also containing preferably 1 to 6 carbon atoms). The quantity of organic aluminum compound is chosen so that the molar ratio of W:Al=1:0,3 to 1:10 and the molar ratio of Ta:Al=1:1 to 1:10.

The preparation of the catalyst itself is carried out by combining the reaction product of the acetal and metal halide at temperatures of between =20° C. and +60° C., preferably —10° C. and +20° C. with the organo metal compound. Generally, a solution of the reaction product is introduced into the reaction vessel and the organic aluminum component (if desired in the form of a solution in one of the solvents mentioned above) is added thereto, preferably with the exclusion of air and moisture. The sequence may be reversed if desired. The catalyst is immediately ready for use.

If desired, the catalyst component may be added to a solution of the monomer, polymerisation then setting in at once. This method is preferred.

Polymerisation: Polymerisation is generally carried out with 5–50%, preferably 10–30% solutions of cyclopentene in one of the solvents mentioned above. Hydrocarbon solvents are particularly suitable for tungsten catalysts, and halogenated hydrocarbons are particularly suitable for tantalum catalysts. As already mentioned above, the catalysts may be produced in the solution of the monomer or the finished catalysts may be added to this solution. The quantity of catalyst preferably corresponds to 0.01–4, preferably 0.1 to 2 mmol of tungsten or tantalum per 100 g. of cyclopentene.

The ring opening polymerisation may be carried out not only on cyclopentene but also on other cycloolefins, e.g. cyclomonoolefins having 5 to 12 carbon atoms as cycloheptene, cyclooctene, cyclododecane. Futhermore, the catalysts according to the invention can be used for copolymerising cyclomono olefins (as defined above) with monocyclic or polycyclic diolefins such as dicyclopentadiene, norbornene, norbornadiene or polyolefins, e.g. aliphatic diolefins such as butadiene, isoprene, in an amount not exceeding 30%, preferably 10% by weight of the total monomer mixture.

The polymerisation temperatures may be adjusted to between —20° C. and +50° C., in which case the polymerisation times are in the range of 10 minutes to 4 hours. The molecular weight of the trans-polypentenamer obtained according to the invention can be influenced to a certain extent by the concentration of tungsten or tantalum, the molar ratio of aluminium to to tungsten (tantalum), the nature of the aluminium component and the quantity of acetal as well as by the presence of $\alpha$-olefines and dienes.

When the required degree of conversion has been reached, polymerisation can be stopped by the addition of alcohols, carboxylic acids and/or amines. Stabilisers and age resistors, e.g. one of the usual products such as phenyl-$\beta$-naphthylamine, 2,6-di-tert.-butyl-4-methylphenol or 2,2′-dihydroxy-3,3′-di-tert.-butyl-5,5′-dimethyl - diphenylmethane may be added in quantities of 0.2–3%. Adhesifying agents, resins and oils may also be added at this stage.

The polymers can be isolated from their solution by precipitation with alcohols or, preferably in technical processes, by driving off the solvent with steam. The lumps of polymer obtained can then be dried in a drying cupboard, if desired under vacuum, in a screw or on a conveyor drier. The trans-polypentenamer obtained is a rubber-like polymer. It can be cross-linked with the known vulcanising agents and worked up into the usual rubber products.

The readily soluble reaction products of tungsten or tantalum halides and acetals used according to the invention can be accurately and reliably dosed so that the composition of catalyst is readily reproducible. They are stable on storage, i.e. the activity of the catalysts prepared from their solutions does not change even after prolonged storage of the solutions. Important requirements for technical application of tungsten and tantalum catalysts for the polymerisation of cyclopentene are thus fulfilled. The trans-polypentenamers obtained using the catalysts according to the invention have excellent properties for working up as well as good properties as vulcanisates.

EXAMPLE 1

(a) Reaction of $WCl_6$ with $CH_2(OCH_2CH_2Cl)_2$ in the molar ratio of 1:0.75

5 parts of $WCl_6$ were dissolved in 140 parts of toluene at room temperature. 1.63 parts of $CH_2(OCH_2CH_2Cl)_2$ dissolved in 10 parts of toluene were added to the deep blue solution at 25° C. The temperature of the solution rose by 4° C. and the colour changed from blue to deep brown. The reaction mixture was stirred for one hour at 25° C.

(b) Polymerisation experiments on cyclopentene

Monomer solutions were prepared from 1000 parts of toluene and 200 parts of cyclopentene in a nitrogen atmosphere in vessels equipped with stirrers with exclusion of moisture so that the water content was less than 10 p.p.m. The tungsten component was added to the monomer solutions at 10° C. in the form of the solution prepared under (a). The solutions were then cooled to −5° C. and the aluminium alkyl component was added with stirring. The polymerisations started at once; the polymerisation temperatures were maintained between −5° C. and 0° C. The polymerisations were stopped after 3 hours by the addition of 0.5% of 2,2'-dihydroxy 3,3'-di-tert-butyl-5,5'-dimethyldiphenylmethane and 1.5% of ethanolamine (based on the monomer) in each case dissolved in 30 parts of ethanol and 60 parts of benzene. The polymers were precipitated with ethanol and dried in vacuum at 50° C. Catalyst composition, yields and properties of the polymers are summarised in Table 1.

(b) Polymerisation of cyclopentene 200 g. of cyclopentene were polymerised under the same conditions as in Example 1(b). The quantity of tungsten in the form of its reaction product with $$CH_2(OCH_3)_2$$

was 0.45 millimol per 100 g. of cyclopentene. The cyclopentene contained 0.075% of butene-1. The aluminium component used was $Al(C_2H_5)_2Cl$, the amount used being such that the molar ratio of Al/W was 2:1. After a polymerisation time of 3 hours, the polymer yield was 65%.

TABLE 1

Catalyst ($WCl_6$ + $CH_2(OCH_2CH_2Cl)_2$ 1:0.75)

| Experiment: | Millimol of tungsten per 100 g. of monomer | Aluminium alkyl | Molar ratio Al/W | Yield, percent | ($\eta$) | Mooney ML 4' 100° C. | Defo/defo elasticity | IR trans-content |
|---|---|---|---|---|---|---|---|---|
| a[1] | 0.45 | $Al(C_2H_5)_3$ | 2.5 | 65 | | | 1,075/6 | |
| b | 0.5 | $Al(C_2H_5)_2Cl$ | 2.5 | 81 | 2.06 | 70 | 1,000/32 | 91.8 |
| c | 0.4 | $Al(C_2H_5)_2Cl$ | 2.5 | 81 | 2.87 | 142 | 1,950/34 | 91.2 |
| d | 0.45 | $Al(C_2H_5)_{1.5}Cl_{1.5}$ | 2.0 | 77 | | 126 | 1,300/20 | 91.0 |
| e | 0.45 | $Al(C_2H_5)_{1.5}Cl_{1.5}$ | 2.5 | 82 | 2.00 | 68 | 400/13 | 91.1 |

[1] 200 p.p.m. of butene-1 were added to the monomer as molecular weight regulator.

EXAMPLE 2

(a) Reaction of $WCl_6$ with $CH_2(OCH_2CH_2Cl)_2$ in the molar ratio of 1:1

5 parts of $WCl_6$ were reacted with 2.2 parts of $$CH_2(OCH_2CH_2Cl)_2$$

at 25° C. under the conditions indicated in Example 1(a); the same rise in temperature was found. The deep brown solution was then stirred for one hour at 30° C.

(b) Polymerisation of cyclopentene

Polymerisation was carried out in the same way as in Example 1(b).

0.45 mmol of tungsten in the form of the solution described in Example 2(a) were used for 100 g. of cyclopentene, and added to the monomer solution at 0° C. $Al(C_2H_5)_2Cl$ was added as the aluminium component in the form of a 10% solution in toluene at −5° C., the molar ratio of Al/W being 2.5:1.

The yield after 3 hours was 81%.

Mooney viscosity ML 4' 100° C.=82
Defo/defo elasticity, 1100/31
IR: trans-content, 91.5%

EXAMPLE 3

Cyclopentene was polymerised with the tungsten solution of Example 2(a) in the same way as in Example 2(b). 0.45 millimol of tungsten was used for 100 g. of cyclopentene. $Al(C_2H_5)_{1.5}Cl_{1.5}$ (ethyl aluminium sesquichloride) was added as the aluminium component in the form of a 10% solution in toluene at −5° C. so that the W/Al molar ratio was 1:2.0. The yield was 81% after 3 hours. After working up as in Example 1(a), the polymer had the following properties:

Mooney viscosity ML 4' 100° C.=101
Defo/defo elasticity, 700/15
IR: trans-linkages 91.9%

EXAMPLE 4

(a) Reaction of $WCl_6$ with $CH_2(OCH_3)_2$ 5 parts of $WCl_6$ were dissolved in 110 parts of toluene at 30° C., and 0.96 part of $CH_2(OCH_3)_2$ was added (with stirring, nitrogen and exclusion of moisture). The temperature of the solution rose to 32° C. and the colour changed from dark blue to deep brown. The solution was then stirred for 1 hour at 30° C.

Mooney viscosity ML 4' 100° C.=85
Defo/defo elasticity, 550/13
IR: trans-bonds: 91.7%

In an experiment carried out for comparison, $WCl_6$ was used in the form of a 4% solution in toluene instead of the reaction product of $WCl_6$ and $CH_2(OCH_3)_2$. The polymer yield was only 23%, intrinsic viscosity ($\eta$)=5.1, IR-trans content 89.8%.

EXAMPLE 5

(a) Reaction of $WCl_6$ with $CH_3CH(OC_2H_5)_2$ 5 parts of $WCl_6$ were dissolved in 130 parts of toluene, and 2.24 parts of $CH_3CH(OC_2H_5)_2$ were added at 25° C. (with stirring, nitrogen and exclusion of moisture). The reaction was slightly exothermic (temperature rise 3° C.) and the colour of the solution changed to dark brown. The solution was stirred for 1 hour at 30° C.

(b) Polymerisation of cyclopentene

Polymerisation was carried out as in Example 1(b), using the tungsten solution prepared under Example 5(a). 0.45 millimol of tungsten was used for 100 g. of cyclopentene. The aluminium component used was $$Al(C_2H_5)_{1.5}Cl_{1.5}$$

(aluminium ethyl sesquichloride), and the molar ratio of Al/W was 3:1.

Polymer yield after 2⅓ hours: 70%
Defo plasticity/defo elasticity, 1950/10
IR content of trans-double bonds, 90.7%

EXAMPLE 6

(a) Reaction of $WCl_6$ with $Cl_3CCH(OCH_3)_2$ 5 parts of $WCl_6$ were dissolved in 130 parts of toluene, and 3.65 parts of the chloral acetal $Cl_3CCH(OCH_3)_2$ were added with stirring. The process was carried out under nitrogen with exclusion of moisture. The temperature rose from 26° C. to 28° C. Stirring was then continued for 2 hours at 25° C. A deep brown solution was obtained.

(b) Polymerisation of cyclopentene

Polymerisation was carried out as in Example 1(b). Tungsten was used as a solution of the reaction product of tungsten hexachloride with $Cl_3—C—CH(OCH_3)_2$ in an amount of 0.45 mmol of tungsten. The polymerisation had the following result

| Aluminum component | Molar ratio | Conversion 3 hours. percent | Defo defo elasticity | IR trans-content |
|---|---|---|---|---|
| Al(C$_2$H$_5$)$_2$Cl | 2.5:1 | 65 | 4,850/39 | 90.8 |
| Al(C$_2$H$_5$)$_{1.5}$Cl$_{1.5}$ | 2.5:1 | 67 | 4,350/39 | 91.5 |

EXAMPLE 7

(a) Reaction of WCl$_6$ with

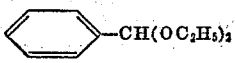

5.1 parts WCl$_5$ were dissolved in 140 parts toluene and 3.5 parts of benzaldehyde-diethylacetale was added at 20° C. with stirring under nitrogen and with exclusion of moisture. The temperature rose by 3° C. The deep brown solution obtained was stirred for one hour at 25° C.

(b) Polymerisation of cyclopentene

According to the method described in Example 1(b) cyclopentene was polymerised using the reaction product described in Example 7(a). The amount of tungsten was 0.5 mmol/100 g. cyclopentene. Al(C$_2$H$_5$)$_{1.5}$Cl$_{1.5}$ was the second catalyst component, its amount was selected so that the molar ratio Al:W was 3:1.

Polymer yield after 2 hours: 54 %
Defo plasticity/defo elasticity: 2500/20
IR-content of trans double-bonds: 88.8%

EXAMPLE 8

4.3 g. TaCl$_5$ were dissolved in 600 ml. of chlorobenzene under exclusion of air and moisture. Then 300 ml. of cyclopentene and 1.6 ml. of dichlorodiethylformal were added. A completely clear solution, having a strong yellow colour, was obtained. This solution was cooled to —10° C. and 12.6 ml. of a 50% solution of ethylaluminum dichloride in hexane was added. Polymerisation started at once. The reacting mixture was stirred for 48 hours at —10° C. and then the polymer was isolated by precipitation with ethanol. 109 g. of a solid rubber-like polymer was obtained having an intrinsic viscosity [η] of 3.2 at 25° C. in toluene. The polymerisation was effected with more than 95% ring opening. The polymer contained 89% of its double bonds in the trans-configuration.

We claim:
1. A catalyst suitable for the ring opening polymerization of cycloolefins consisting of the reaction product of
   (a) a reaction product of a tungsten or tantalum halide with an acetal of the formula

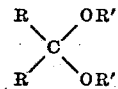

wherein R is hydrogen, alkyl having 1 to 6 carbon atoms, haloalkyl having 1 to 6 carbon atoms or aryl having up to 12 carbon atoms and where R' is haloalkyl having 1 to 6 carbon atoms with
   (b) aluminum trialkyl, aluminum dialkyl halide, aluminum alkyl dihalide or a mixture thereof, the molar ratio of tungsten to aluminum being from 1:0.3 to 1:10 and the molar ratio of tantalum to aluminum being from 1:1 to 1:10.

2. The catalyst of claim 1 wherein said tungsten or tantalum halide is tungsten hexachloride or tantalum pentachloride.

3. The catalyst of claim 2 wherein the molar ratio of tungsten halide to said acetal is 1:0.6 to 1:6 and the molar ratio of said tantalum pentachloride to said acetal is 1:0.6 to 1:5.

4. The catalyst of claim 1 wherein said acetal is of the formula $$CH_2(OCH_2CH_2Cl)_2$$

5. The catalyst of claim 1 wherein said acetal is of the formula $$CH_3CH(OCH_2CH_2Cl)_2$$

6. The catalyst of claim 1 wherein said acetal is of the formula

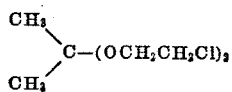

| 3,116,274 | 12/1963 | Boehm et al. | 252—429 B |
| 3,449,310 | 6/1969 | Dall Asta et al. | 252—429 B |
| 3,492,245 | 1/1970 | Calderon et al. | 252—429 B |

PATRICK P. GARVIN, Primary Examiner

U.S. Cl. X.R.

260—93.1